Feb. 12, 1957     H. R. HOLMES     2,781,211

ADAPTER PLATE FOR STEERABLE WHEEL

Filed Sept. 14, 1953

INVENTOR.
Harleigh R. Holmes
BY
Martin E. Anderson
ATTORNEY

2,781,211
ADAPTER PLATE FOR STEERABLE WHEEL

Harleigh R. Holmes, Littleton, Colo.

Application September 14, 1953, Serial No. 380,042

1 Claim. (Cl. 287—20)

This invention relates to improvements in front drive wheel and hub assemblies and has reference more particularly to a front wheel hub construction comprising an adapter plate by means of which several different makes of front wheels can be attached to front wheel drive axles to obtain a more desirable power transmission of great strength and durability.

Today there are many four wheel drive trucks made and sold, each make, as a rule, has its own front wheel drive, some of which are of poor design and of short life.

It is the object of this invention to produce a front wheel drive that can be used on most of the ordinary four wheel drive trucks of moderate capacity and which will be of a sturdy construction and so designed that the trunnions that connect the front wheels to the axle housing will be subjected to the least possible strain commensurate with a practical and sturdy design.

Another object is to produce a wheel and hub assembly of such a construction that the tire carrying part of the wheel can be readily removed and reapplied.

Another object is to produce a construction which permits the hub, including the brake drum, drive yoke and gimbal assembly to be removed from the front axle housing and the front axle, as a unit so that it can be fully assembled and adjusted on the bench in a shop and applied to the front axle by the simple expedient of inserting the trunnions which are standard and designed for this purpose.

A further object is to produce an adapter plate or hub member of such construction that a wheel having the standard or usual brake backing plate and brake mechanism can be attached directly thereto making it possible to use any of several makes of front wheels.

Having thus, in a general way, described the invention and its objects, the construction to which the invention relates will now be described in detail, for which purpose reference will now be had to the accompanying drawing in which the invention has been illustrated and in which Figure 1 is a diametrical cross section through a wheel and hub assembly showing the improved construction;

Figure 4:
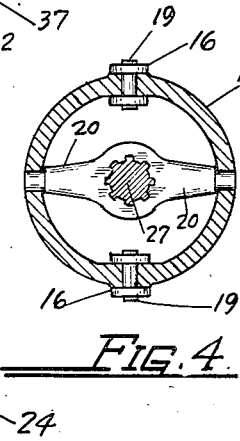
Figure 4 is a section through the gimbal ring, torque bar and the ends of the drive yoke taken on line 4—4 of Figure 1.

Referring now to the drawing, reference numeral 10 designates the front axle housing, 11 the suspension yoke which has a tubular hub 12 that extends into the axle housing and is attached thereto in any approved manner, as by welding. Mounted in the axle housing is the main drive shaft 13 which turns in the usual anti-friction bearing 14. The end of shaft 13 is splined as indicated by S and carries the drive yoke 15 that has a hub provided with a splined opening which receives the splined end of shaft 13. The two arms 16 are identical and their ends have openings 17 for the reception of the gimbal or compensating ring 18 that has diametrical points connected therewith by pins 19. The torque bar 20 has its ends pivotally connected with the gimbal ring at diametrical points spaced ninety degrees from pins 19, as indicated in Figure 4. It is to be understood that suitable anti-friction bearings are used at all points where they are desired but in the drawing they have not been shown in all places where they are used.

Figure 2:
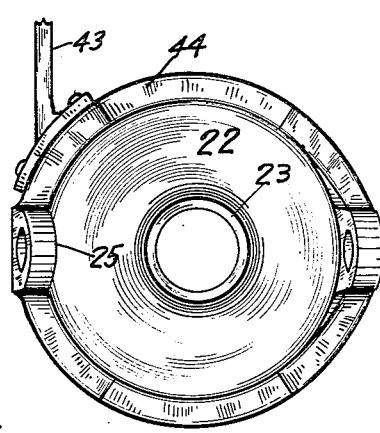
Figure 2 is a top plan view of the adapter plate which forms an important element of the assembly shown in Figure 1.
Figure 3:
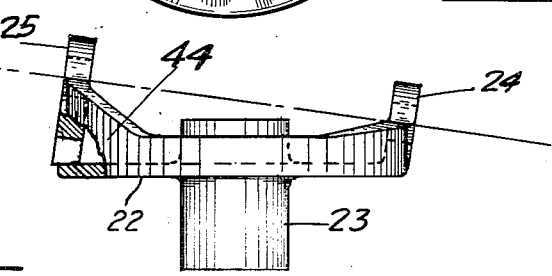
Figure 3 is a side elevational view looking upwardly in Figure 2.

Attached to the ends 21, 21a of the suspension yoke is a plate which for want of a better name will be referred to by the term, adapter plate. This plate has been identified by numeral 22, which also refers specifically to the central part thereof. The adapter plate has been shown separately in Figures 2 and 3 from which it will be seen that it comprises a circular central portion 22 having an integral hub 23 which projects from opposite sides of the central plate 22. Projecting to one side of the center plate are two lugs 24 and 25 that are inclined in the same direction with respect to the central axis and are spaced so that they can receive between them the ends 21 and 21a respectively of the suspension yoke to which they are then pivotally connected by suitable anti-friction bearings that have been indicated by pivot pins 26. Attention is called in particular to Figure 1 and to the fact that the ring $a$ that carries the grease seal $b$ at the outer bearing $c$ is in engagement with the inner surface of flange 29 and with the inner bearing race of the outer bearing and a similar ring $d$ is positioned between the torque arm 20 and the inner race of the inner bearing $e$. When the bearings wear they can be tightened by turning nut 28 and forcing the torque arm outwardly. It is evident that drive yoke 15 will follow the movements of the torque arm as it moves outwardly when the bearings are adjusted for wear. To permit adjustments to be made without setting up objectionable strains in the universal the drive yoke 15 is slidably splined to the end of shaft 13.

Figure 1:
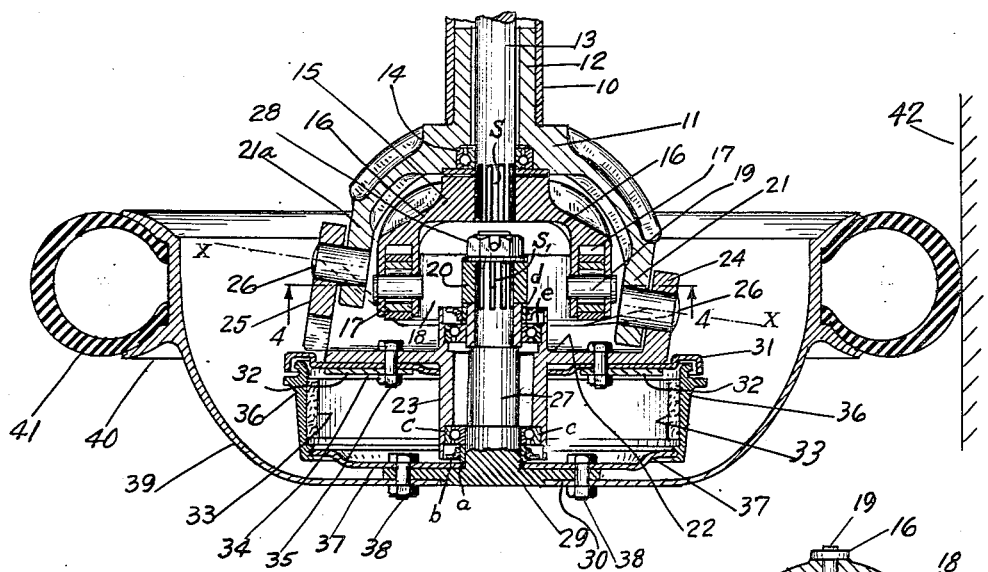
Figure 5:
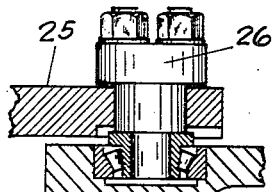
Figure 5 is a view showing one construction of trunnion.

The bearings that are represented by pivot pins 26 have been shown in somewhat greater detail in Figure 5, and are readily removable so that the adapter plate and all parts carried thereby can be easily separated from the suspension yoke when necessary. The adapter plate has several important elements attached to it which will now be described. A short drive shaft 27 is journaled in hub 23. Suitable anti-friction bearings $c$ and $e$ are provided between this shaft and the ends of the hub as shown in Figure 1. Torque bar 20 is splined to the inner end of shaft 27 as at $S_1$ and is held in place by a nut 28. The outer end of shaft 27 has a circular flange 29 which has a peripheral zone 30 of less thickness than the center part so that two shoulders are formed that are concentric with axle 27 and serve to center the brake drum and the wheel to which reference will be made later.

A brake backing plate 31 and a plate 32, to which the brake shoes 33 and the brake operating mechanism 34 are fastened are both attached to plate 22 by means of bolts 35. The brake backing plate 31, brake mechanism carrying plate 32, brake shoes 33 as well as the brake drum 36 and plate 37, to the periphery of which the brake drum is attached, are all old and well known and will therefore not be described in detail. To parts 29 and 37 that have been described, the wheel is attached by bolts 38 which also hold the brake drum in place. The wheel has been shown in a general way as comprising a disked plate 39 carrying a tire rim 40 and a tire 41.

Let us now assume that the wheel and hub assembly above described rests on a surface at the right, which has been designated by numeral 42; this brings the tire surface to the left to the top. A steering arm 43 has been shown in Figure 2 as attached to the re-enforcing flange 44 of the adapter plate and represents any similar element to which the steering gear is attached. No attempt has been made to show the steering gear as it is designed to fit the particular construction and involves nothing novel.

The wheel is pivoted for steering on pivots or trunnions 26, which, as shown, are on an axis X—X inclined upwardly and inwardly. Torque is transmitted to the wheel by the drive yoke, gimbal ring, torque bar, shaft 27 and flange 29, all as clearly evident from Figure 1. The hub comprising all of the parts carried by the adapter plate, including the drive yoke, are assembled, adjusted and tested in the shop where the work can be conveniently done, and are then attached to the suspension yoke. Since the drive yoke is splined to the end of shaft 13, it can be removed from the shaft and applied thereto by a sliding motion. All of the bearings are dust sealed and no enclosing housing is necessary to protect them from dirt and dust.

If it becomes necessary or desirable to make adjustments that can best be made in a shop, trunnions 26 are removed whereupon the assembly as a whole, can be removed from the suspension yoke. If parts within the brake drum are to be replaced or repaired, nut 28 can be removed and shaft 27, together with the wheel and the brake drum, can then be removed leaving the brake mechanism exposed.

By the use of the adapter plate it is possible to employ standard parts, now available on the open market, for most of the other parts and this makes it possible to construct the assembly at a very moderate cost.

What is claimed as new is:

As an article of manufacture, an adapter plate for use in a front wheel hub and transmission assembly, comprising a substantially planar circular central portion provided at its center with an elongated tubular hub that projects unequal distances from opposite sides thereof, two diametrically positioned lugs projecting from the side having the shorter hub projection, one lug being longer than the other and inclined inwardly in the direction of the axis of the hub, the two lugs being provided with inwardly facing parallel surfaces and with aligned openings for trunnions, the side of the plate having the lugs being also provided along its periphery with reenforcing flanges operatively joined to the lugs.

References Cited in the file of this patent

UNITED STATES PATENTS

| | | |
|---|---|---|
| 963,609 | Mascord | July 5, 1910 |
| 1,429,271 | Barker | Sept. 19, 1922 |
| 2,075,564 | Alden | Mar. 30, 1937 |
| 2,107,073 | Herrington | Feb. 1, 1938 |
| 2,189,695 | Alden | Feb. 6, 1940 |
| 2,623,604 | Keese | Dec. 30, 1952 |